(12) United States Patent
Wang et al.

(10) Patent No.: US 11,575,274 B2
(45) Date of Patent: Feb. 7, 2023

(54) BIDIRECTIONAL CHARGING METHOD AND DEVICE, TERMINAL AND STORAGE MEDIUM

(71) Applicant: Beijing Xiaomi Mobile Software Co., Ltd., Beijing (CN)

(72) Inventors: Yanteng Wang, Beijing (CN); Changyu Sun, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 196 days.

(21) Appl. No.: 16/923,397

(22) Filed: Jul. 8, 2020

(65) Prior Publication Data
US 2021/0249890 A1     Aug. 12, 2021

(30) Foreign Application Priority Data
Feb. 12, 2020 (CN) .......................... 202010088574.4

(51) Int. Cl.
   *H02J 7/00*        (2006.01)
   *H02J 7/04*        (2006.01)
   *H02J 50/12*      (2016.01)

(52) U.S. Cl.
CPC ............ *H02J 7/04* (2013.01); *H02J 7/00045* (2020.01); *H02J 50/12* (2016.02); *H02J 2207/20* (2020.01)

(58) Field of Classification Search
CPC ....................................................... H02J 7/04
(Continued)

(56) References Cited

U.S. PATENT DOCUMENTS

| 10,714,961 | B2 * | 7/2020 | Yamamoto ............. H02J 50/80 |
| 2011/0285349 | A1 | 11/2011 | Widmer et al. | |
| 2013/0049456 | A1 * | 2/2013 | Kim ........................ H02J 50/12 |
| | | | 307/104 |

(Continued)

FOREIGN PATENT DOCUMENTS

| JP | 2006287555 A | 10/2006 |
| JP | 2013523070 A | 6/2013 |

(Continued)

OTHER PUBLICATIONS

European Search Report in European Application No. 20188495.4, dated Nov. 17, 2020.

(Continued)

*Primary Examiner* — Yalkew Fantu
(74) *Attorney, Agent, or Firm* — Finnegan, Henderson, Farabow, Garrett & Dunner, L.L.P.

(57) ABSTRACT

A charging device, implemented by a first terminal, includes a transceiver, a voltage converter, and a power supply. The voltage converter is connected with the transceiver and the power supply, and is configured to step up a voltage output by the power supply and provide the stepped up voltage for the transceiver when the first terminal supplies power, and to step down a voltage input by the transceiver and supply the stepped down voltage to the power supply when the first terminal is charged. The transceiver is configured to send a wireless charging signal out based on the voltage stepped up by the voltage converter when the first terminal supplies power, and to receive a wireless charging signal and convert the received wireless charging signal into an input voltage to transmit the input voltage to the voltage converter when the first terminal is charged.

20 Claims, 9 Drawing Sheets

(58) Field of Classification Search
USPC .......................................................... 320/108
See application file for complete search history.

(56) References Cited

U.S. PATENT DOCUMENTS

| | | | |
|---|---|---|---|
| 2014/0077614 A1* | 3/2014 | Park | H02J 50/40 |
| | | | 307/104 |
| 2014/0152251 A1* | 6/2014 | Kim | H02J 50/12 |
| | | | 320/108 |
| 2015/0061590 A1 | 3/2015 | Widmer et al. | |
| 2016/0033982 A1* | 2/2016 | Moon | H02M 3/156 |
| | | | 323/281 |
| 2017/0098957 A1 | 4/2017 | Sankar | |
| 2018/0062430 A1 | 3/2018 | Matsumoto et al. | |
| 2018/0152051 A1 | 5/2018 | Kim et al. | |

FOREIGN PATENT DOCUMENTS

| | | |
|---|---|---|
| JP | 2017135795 A | 8/2017 |
| KR | 20150048879 A | 5/2015 |
| KR | 20150057783 A | 5/2015 |
| KR | 20180006665 A | 1/2018 |
| WO | WO 2019171766 A1 | 9/2019 |

OTHER PUBLICATIONS

Examination Report of Indian Application No. 202044033976, dated Sep. 1, 2021.
Notification of Reason for Refusal for Korean Application No. 10-2020-0091331, dated Feb. 17, 2022.

* cited by examiner

BIDIRECTIONAL CHARGING METHOD AND DEVICE, TERMINAL AND STORAGE MEDIUM

CROSS-REFERENCE TO RELATED APPLICATION

This application is based upon and claims priority to Chinese Patent Application No. 202010088574.4, filed on Feb. 12, 2020, the entire contents of which are incorporated herein by reference.

TECHNICAL FIELD

The present disclosure generally relates to the technical field of charging, and more particularly, to a charging method and device, a terminal and a storage medium.

BACKGROUND

Along with the development of wireless charging technologies, more and more terminals, including many wearable devices and intelligent terminals, have started using the wireless charging technologies for charging. The wireless charging technologies mainly include a wireless power consortium (WPC)-standard-based magnetic induction wireless charging technology and an alliance for wireless power (A4WP)-standard-based magnetic resonance technology. There are more and more scenarios where mobile terminals adopt wireless charging, and many mobile phones support wireless reverse charging technologies. However, most of the mobile phones support reverse charging at a relatively low power.

SUMMARY

According to a first aspect of embodiments of the present disclosure, a charging device, implemented by a first terminal, includes a transceiver, a voltage converter, and a power supply. The voltage converter may include at least two step-up ratios. The voltage converter may be connected with the transceiver and the power supply, and may be configured to step up a voltage output by the power supply and provide the stepped up voltage for the transceiver when the first terminal supplies power, and to step down a voltage input by the transceiver and supply the stepped down voltage to the power supply when the first terminal is charged. The transceiver may be configured to send a wireless charging signal out based on the voltage stepped up by the voltage converter when the first terminal supplies power, and to receive a wireless charging signal and convert the received wireless charging signal into an input voltage to transmit the input voltage to the voltage converter when the first terminal is charged.

According to a second aspect of the embodiments of the present disclosure, a charging method, applied to a first terminal, includes: acquiring a control signal; determining whether the control signal is a power supply control signal or not; when the control signal is the power supply control signal, selecting a target power supply step-up mode from at least two step-up modes to step up a battery voltage of the first terminal; and sending a wireless charging signal out based on a stepped-up power supply signal.

According to a third aspect of the embodiments of the present disclosure, a terminal includes: a processor; and a memory configured to store instructions executable by the processor. The processor may be configured to execute the instructions to perform the charging method according to the second aspect.

According to a fourth aspect of the embodiments of the present disclosure, a computer-readable storage medium has stored therein instructions that, when executed by a processor of a terminal, cause the terminal to perform the charging method according to the second aspect.

It is to be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are for describing exemplary embodiments only, and are not intended to limit the present disclosure. For example, although the terms "first," "second," "third," etc. may be used to describe various information in the present disclosure, the information should not be limited to these terms. The terms are only used to distinguish the same type of information from each other. For example, without departing from the scope of the present disclosure, first information may also be referred to as second information, and similarly, second information may also be referred to as first information.

Figure 1:
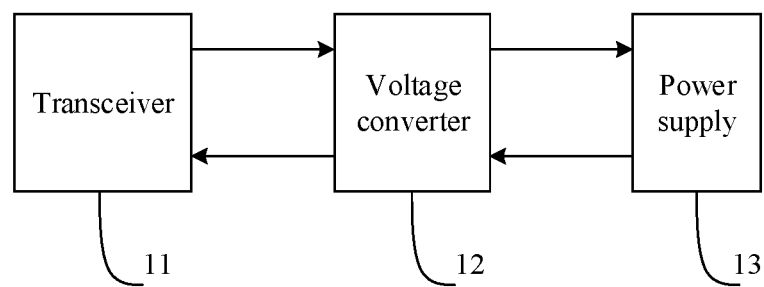
FIG. 1 is a block diagram of a charging device according to an exemplary embodiment.

FIG. 1 is a block diagram of a charging device according to an exemplary embodiment. As shown in FIG. 1, the charging device includes a transceiver 11, a voltage converter 12, and a power supply 13. The voltage converter 12 may include at least two step-up ratios.

The voltage converter 12 may be connected with the transceiver 11 and the power supply 13, and may be configured to step up a voltage output by the power supply 13 for provision for the transceiver 11 when a first terminal supplies power, or, step down a voltage input by the transceiver 11 for supplying to the power supply 13 when the first terminal is charged.

The transceiver 11 may be configured to send a wireless charging signal out based on the voltage stepped up by the voltage converter 12 when the first terminal supplies power, or, receive a wireless charging signal and convert the received wireless charging signal into the input voltage to transmit the input voltage to the voltage converter 12 when the first terminal is charged.

The charging device provided in the embodiments of the present disclosure may be applied to the first terminal. The first terminal may be any electronic device capable of receiving a radio frequency signal. For example, the first terminal may be a mobile communication device or a notebook computer, etc.

In the embodiments of the present disclosure, the first terminal may be configured for power supply or charging. When the first terminal is configured for power supply, the transceiver 11 may be configured to send a radio signal out; and when the first terminal is configured for charging, the transceiver 11 may be configured to receive a radio signal.

In an embodiment, the transceiver 11 may include a coil. The coil may be configured to generate electromagnetic induction to send or receive a radio signal.

In the embodiments of the present disclosure, the voltage converter 12 may be an N: 1 module or a 1:N module, N being a positive integer greater than 1. For example, N may be 2, 3 or 4. The voltage converter 12 may include at least two step-up ratios. For example, the step-up ratio may be 2:1, 3:1, or 4:1.

In an embodiment, the voltage converter 12 may be an N: 1 module, N being a positive integer larger than or equal to 1.

In the embodiments of the present disclosure, when the first terminal is configured for power supply, the voltage converter 12 may be a 1:N module configured to indicate that an output voltage is N times an input voltage. When the first terminal is configured for charging, the voltage converter may be an N: 1 module configured to indicate that an output voltage is 1/N of an input voltage.

For example, 1:1 is configured to indicate that an output voltage is equal to an input voltage; 1:2 is configured to indicate that an output voltage is double an input voltage; 1:3 is configured to indicate that an output voltage is three times an input voltage; 1:4 is configured to indicate that an output voltage is four times an input voltage; 4:1 is configured to indicate that an output voltage is $1/4$ of an input voltage; 3:1 is configured to indicate that an output voltage is $1/3$ of an input voltage; and 2:1 is configured to indicate that an output voltage is $1/2$ of an input voltage.

When the first terminal is configured for power supply, the voltage converter 12 may work in a step-up mode.

For example, when the voltage converter 12 is a 1:4 module and the first terminal is configured for power supply, a ratio of an input voltage to an output voltage of the voltage converter may be switched among 1:4, 1:3, 1:2 and 1:1.

For another example, when the voltage converter 12 is a 1:3 module and the first terminal is configured for power supply, the ratio of an input voltage to an output voltage of the voltage converter may be switched among 1:3, 1:2 and 1:1.

When the first terminal is configured for charging, the voltage converter 12 may work in a step-down mode.

For example, when the voltage converter 12 is a 4:1 module and the first terminal is configured for charging, the ratio of an input voltage to an output voltage of the voltage converter may be switched among 4:1, 3:1, 2:1 and 1:1.

For another example, when the voltage converter 12 is a 3:1 module and the first terminal is configured for charging, the ratio of an input voltage to an output voltage of the voltage converter may be switched among 3:1, 2:1 and 1:1.

It can be understood that, when the ratio of an input voltage to an output voltage of the voltage converter is 1:1, the voltage converter 12 may be considered as a through switch.

The voltage converter 12 may also be considered as a current adjustment module. For example, the voltage converter 12 is a 1:4 module. An output voltage of the voltage converter 12 is four times an input voltage and an output current of the voltage converter 12 is $1/4$ of an input current, when the step-up ratio adopted by the first terminal is 1:4. The output voltage of the voltage converter 12 is three times the input voltage and the output current of the voltage converter is $1/3$ of the input current, when the step-up ratio adopted by the first terminal is 1:3.

In some embodiments, a voltage or current conversion function of the voltage converter 12 may be realized through a charge pump technology and the like.

In some embodiments, the voltage converter 12 may further be configured to implement conversion from a direct current to an alternating current or from an alternating current to a direct current. When the first terminal is configured for power supply, the voltage converter 12 may convert a stepped-up direct-current voltage into an alternating-current voltage; and when the first terminal is configured for charging, the voltage converter 12 may convert an alternating-current voltage into a direct-current voltage for stepping down.

In some embodiments, the charging device may further include an inversion and rectification module. The inversion and rectification module may be arranged between the transceiver 11 and the voltage converter 12, and is configured to convert the direct-current voltage output by the voltage converter 12 into an alternating-current voltage when the first terminal supplies power, or, convert an alternating-current voltage output by the transceiver 11 into a direct-current voltage when the first terminal is charged.

In the embodiments of the present disclosure, the power supply 13 may include a power management chip, or include a power management chip and a peripheral circuit, which is not limited in the present disclosure.

In the embodiments of the present disclosure, the charging device may include a transceiver, a voltage converter, and a power supply. The transceiver may receive a wireless charging signal and convert the received wireless charging signal into an input voltage for transmission to the voltage converter, and the voltage converter may step down the input voltage provided by the transceiver for supplying to the power supply, thereby implementing charging of the first terminal. Moreover, the voltage converter may step up an output voltage of the power supply for provision for the transceiver, and the transceiver may send a wireless charging signal out based on the voltage stepped up by the voltage converter, thereby implementing power supply of the first terminal. In such a manner, the charging device can not only charge the first terminal but also use the first terminal to charge another receiving device as a wireless charging transmitter, so that the intelligence of an electronic device is improved, and a wireless charging requirement of a user can be further met.

In addition, the voltage converter includes at least two step-up ratios, therefore, when the first terminal is configured for power supply, a proper step-up ratio can be adopted to charge another receiving device, and a charging requirement of the another receiving device can be met. Moreover, when the voltage converter adopts a relatively high step-up ratio, the power of the first terminal for power supply can also be greatly increased, which is favorable for increasing the charging speed of the another receiving device and improving the power supply efficiency.

Furthermore, the power of the first terminal for power supply is increased by stepping up a voltage, so that a current in a coil in the transceiver is maintained in a controllable range, heat of the coil can be reduced, and loss of the coil can be further reduced.

Figure 2:
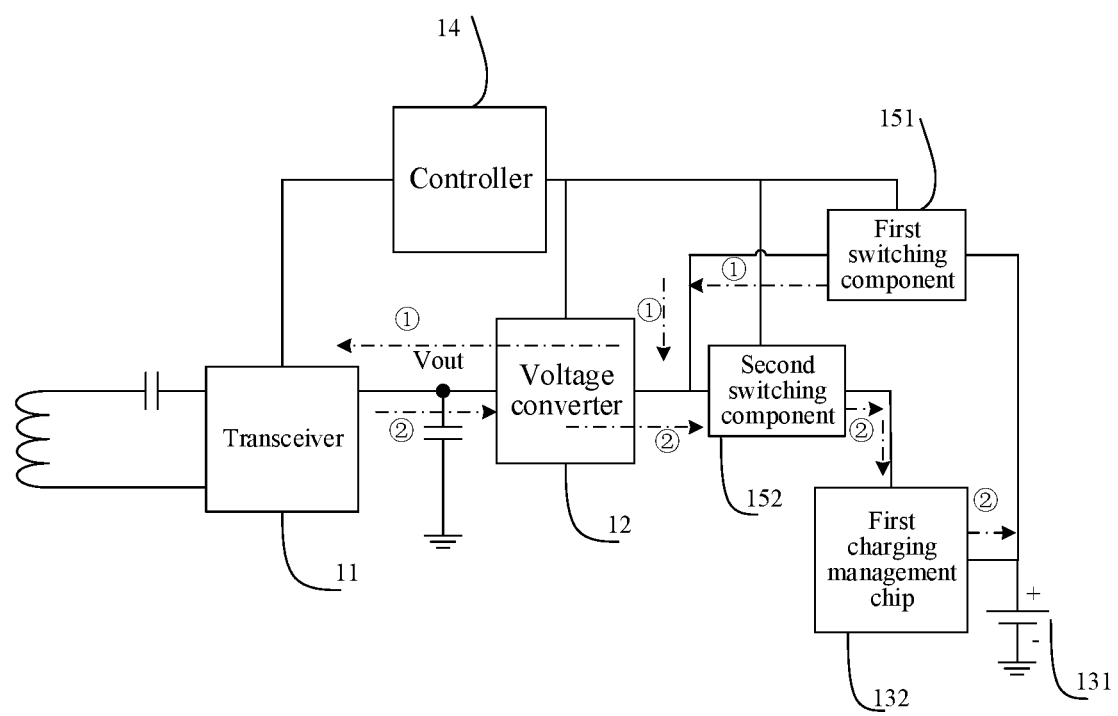
FIG. 2 is a block diagram of a charging device according to an exemplary embodiment.

FIG. 2 is a block diagram of a charging device according to an exemplary embodiment. As shown in FIG. 2, the charging device may further include: a controller 14 connected with the voltage converter, which includes a battery 131 and a first charging management chip 132 in the embodiment.

The controller 14 is configured to control the step-up ratios of the voltage converter for stepping up.

The controller 14 typically controls overall operations of the charging device, for example, controlling the step-up ratio adopted by the voltage converter 12 and controlling to turn on or off a switch in the charging device. The controller 14 may include one or more processors for executing instructions to implement a corresponding operation.

In the embodiments of the present disclosure, the controller 14 may control the step-up ratios of the voltage converter 12 for stepping up through a control signal and the like. For example, when the voltage converter 12 is a 1:4 module, the controller 14 may control the step-up ratio of the voltage converter to be 1:4, 1:3, 1:2, or 1:1.

In the embodiments of the present disclosure, the step-up ratio of the voltage converter 12 for stepping up may be controlled based on the controller 14 such that the first terminal can adopt different step-up ratios for adaptation to charging requirements of different receiving devices during power supply.

In some embodiments, the device may further include a switch connected with the voltage converter 12 and the power supply 13. The switch may include a first switching component 151 and a second switching component 152.

The switch may be further connected with the controller 14, and is configured to switch an on/off state based on a received control signal sent by the controller 14 to isolate a power supply loop from a charging loop of the charging device. The power supply loop, represented by the sign ① in FIG. 2, may be a loop formed by the power supply, the first switching component 151, the voltage converter 12, and the transceiver 11. The charging loop, represented by the sign ② in FIG. 2, may be a loop formed by the transceiver 11, the voltage converter 12, the second switching component 152, and the power supply.

The first switching component 151 and the second switching component 152 may be various switching components. For example, the first switching component 151 and the second switching component 152 may be single-pole single-throw switches, relays or metal oxide semiconductor field-effect transistors, which is not limited in the present disclosure.

In the embodiments of the present disclosure, when the first switching component 151 is turned on and the second switching component 152 is turned off, the first terminal is configured for power supply; and when the first switching component 151 is turned off and the second switching component 152 is turned on, the first terminal is configured for charging. Therefore, the power supply loop and the charging loop may be isolated according to whether the first switching component 151 and the second switching component 152 are turned on or not.

In some embodiments, a power supply loop may not be isolated from a charging loop. For example, for the charging device shown in FIG. 3, a voltage converter 302 is connected with a first charging management chip 303 through a first switching component 305. The charging device is controlled for power supply when the first switching component 305 is turned on and the first charging management chip 303 does not work, and the charging device is controlled for charging when the first switching component 305 is turned on and the first charging management chip 303 works. In such case, the power supply loop for power supply is not isolated from the charging loop for charging. In addition, the voltage converter 302 is not a converter based on a 1:N step-up ratio, so that the charging power of the charging device is not so high and the charging efficiency is also not high.

Referring back to FIG. 2, the first switching component 151 may be connected with the voltage converter 12 and the battery 131.

The second switching component 152 may be connected with the voltage converter 12 and the first charging management chip 132. The first charging management chip 132 may be connected with the battery 131. When the first terminal is charged, the first charging management chip 132 may be configured to adjust the voltage stepped up by the voltage converter 12 to a preset threshold range.

For example, the first charging management chip 132 may be a chip for wireless charging management.

In the embodiments of the present disclosure, the first switching component 151 may be directly connected with the battery 131 of the first terminal. When the first terminal is configured for power supply, energy may be acquired from the battery 131 and a wireless signal may be sent out through the power supply loop.

The first charging management chip 132 may be further connected with the second switching component 152 and the battery 131. When the first terminal is configured for charging, a magnitude of a voltage input to the battery 131 may be controlled based on the first charging management chip 132. Therefore, when a voltage input to the battery 131 through the charging loop is excessively high, the voltage input to the battery 131 may also be controlled to be stepped down to implement overvoltage protection over the first terminal during charging.

Figure 4:
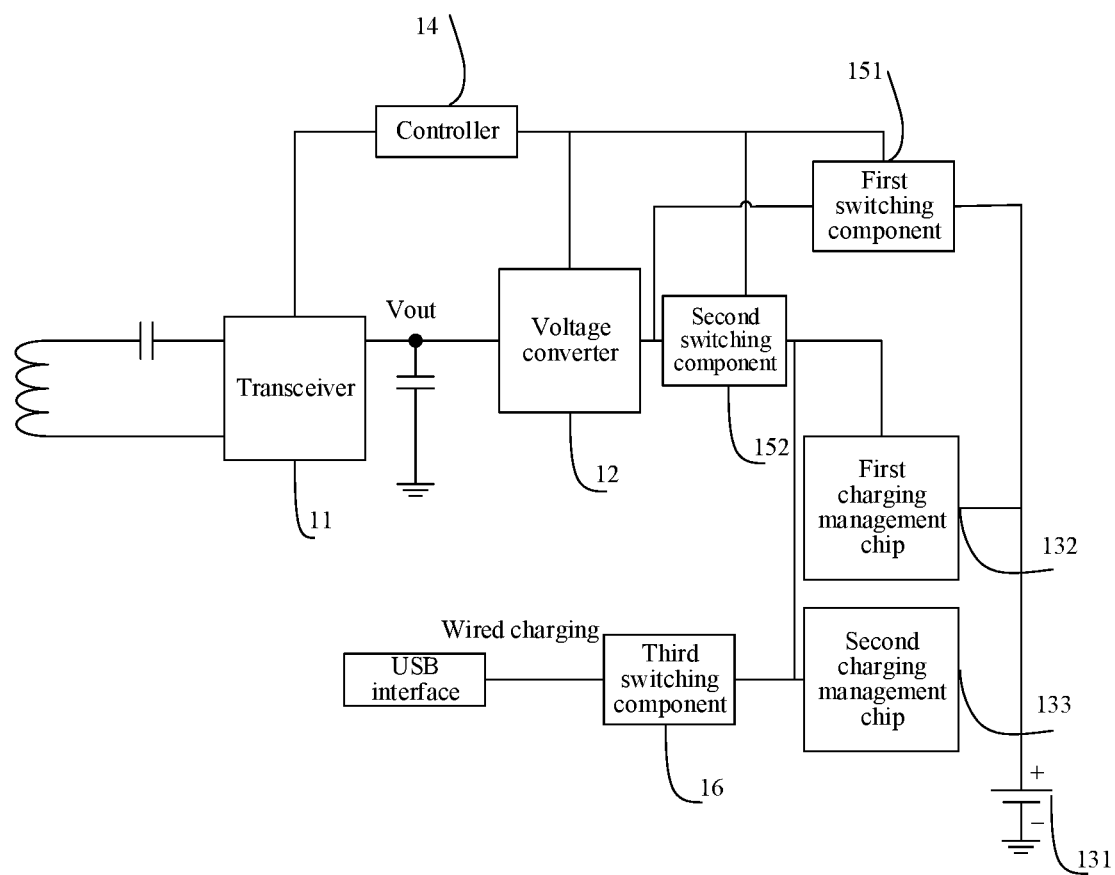
FIG. 4 is a block diagram of a charging device according to an exemplary embodiment.

FIG. 4 is a block diagram of a charging device according to an exemplary embodiment. Referring to FIG. 4, the charging device may further include a third switching component 16. The power supply may further include a second charging management chip 133.

The third switching component 16 may be connected with a universal serial bus (USB) interface of the first terminal.

The second charging management chip 133 may be connected with the third switching component 16 and the battery 131.

The second charging management chip 133 may be configured to send a control signal of controlling whether to turn on the third switching component 16 or not to the third switching component 16 based on a wired charging signal received by the USB interface. The wired charging signal received by the USB interface may be transmitted to the power supply when the third switching component 16 is turned on.

For example, the third switching component 16 may be a single-pole single-throw switch, a relay or a metal oxide semiconductor field-effect transistor, which is not limited in the present disclosure.

For example, the second charging management chip 133 may be a chip for wired charging management.

In the embodiments of the present disclosure, the third switching component 16 may also be controlled to be turned on or off through the second charging management chip 133 to or not to implement charging of the first terminal through a wired charging signal.

In another embodiment, the third switching component 16 may also be connected with the controller 14. In such a manner, turning-on or turning-off of the third switching component 16 may be controlled through a control signal sent by the controller 14, thereby implementing charging of the first terminal through a wired charging signal. Therefore, in the embodiments, the first switching component 151, the second switching component 152, or the third switching component 16 can be controlled to be turned on or off through a control signal, thereby causing the first terminal to or not to implement wireless power supply, wireless charging or wired charging.

Figure 3:
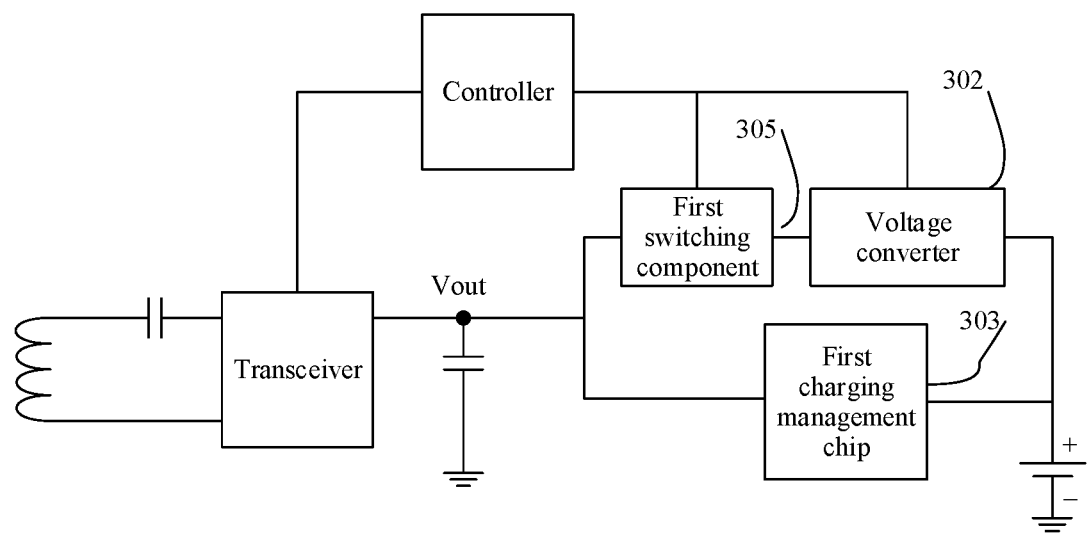
FIG. 3 is a block diagram of a charging device according to an exemplary embodiment.
Figure 5:
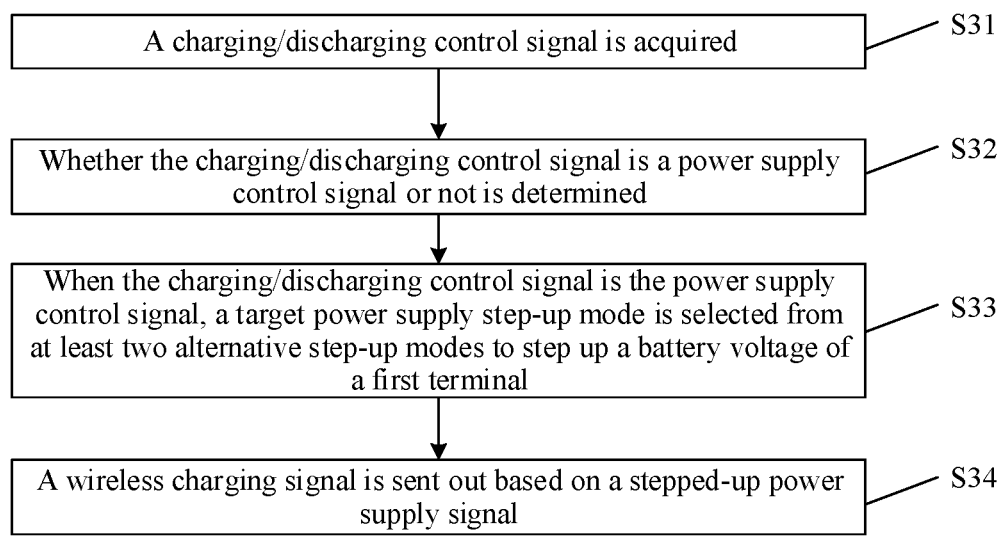
FIG. 5 is a flowchart showing a charging method according to an exemplary embodiment.

FIG. 5 is a flowchart showing a charging method according to an exemplary embodiment. As shown in FIG. 3, the charging method includes the following operations.

In S31, a charging/discharging control signal is acquired.

In S32, whether the charging/discharging control signal is a power supply control signal or not is determined.

In S33, when the charging/discharging control signal is the power supply control signal, a target power supply step-up mode is selected from at least two alternative step-up modes to step up a battery voltage of a first terminal.

In S34, a wireless charging signal is sent out based on a stepped-up power supply signal.

The charging method may be applied to the first terminal described above. The first terminal may be any electronic device capable of receiving a radio frequency signal. For example, the first terminal may be a mobile communication device or a notebook computer, etc. Herein, the first terminal may also be configured to send a radio frequency signal.

The charging/discharging control signal may include a power supply control signal or a charging control signal. The power supply control signal may correspond to a power supply step-up mode, and the charging control signal may correspond to a charging step-down mode.

The power supply step-up mode may include at least two alternative power supply step-up modes.

Figure 6:
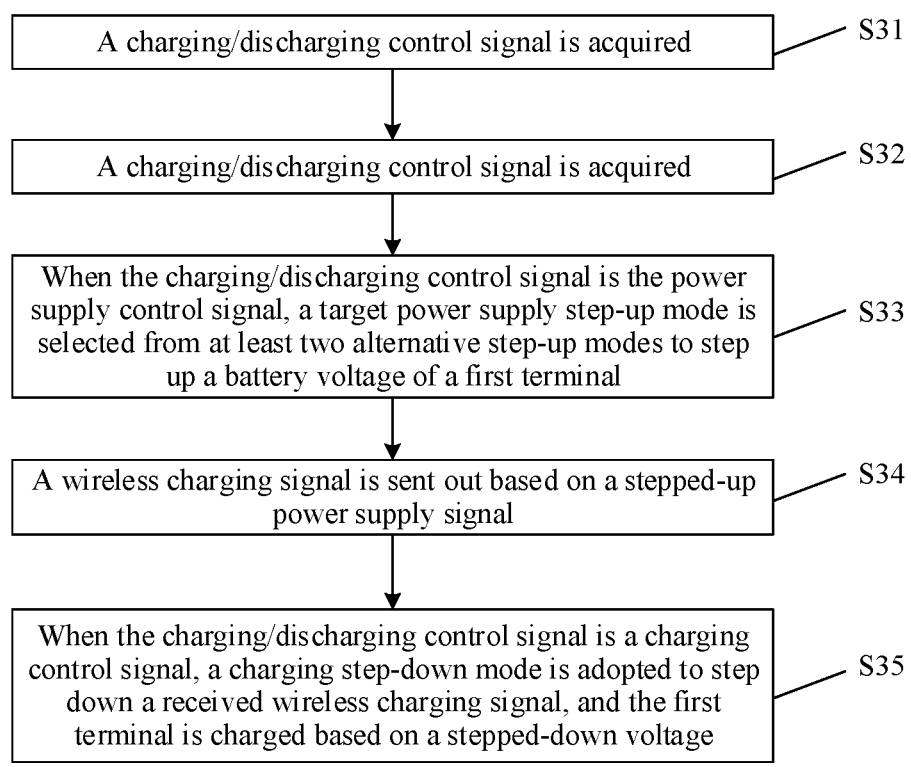
FIG. 6 is a flowchart showing a charging method according to an exemplary embodiment.

FIG. 6 is a flowchart showing a charging method according to an exemplary embodiment. As shown in FIG. 6, the method may further include the following operation.

In S35, when the charging/discharging control signal is a charging control signal, a charging step-down mode is adopted to step down a received wireless charging signal, and the first terminal is charged based on a stepped-down voltage.

The power supply step-up mode may refer to stepping up an input voltage by a predetermined ratio before output; and the charging step-down mode may refer to stepping down an input voltage by a predetermined ratio before output.

For example, when the power supply step-up mode is a 1:4 mode, an output voltage can be four times an input voltage; and when the charging step-down mode is a 4:1 mode, an output voltage can be ¼ of an input voltage.

The power supply step-up mode may be a 1:N mode, and the charging step-down mode may be a 1:N mode, N being a positive integer greater than 1.

In some embodiments, the method may include that: a step-up ratio for the target power supply step-up mode is determined based on the charging/discharging control signal, the step-up ratio including at least two step-up ratios.

The target power supply step-up mode may be a 1:N mode, N being a positive integer greater than 1. For example, when the target power supply step-up mode is a 1:4 mode, the step-up ratio may be 1:2, 1:3, or 1:4. When the target power supply step-up mode is a 1:3 mode, the step-up ratio may be 1:2 or 1:3.

The step-up ratio may be 1:N. For example, the step-up ratio may be 1:2, 1:3, or 1:4.

In the embodiments of the present disclosure, when it is determined that the charging/discharging control signal is a power supply control signal, the power supply step-up mode may be adopted to step up a battery voltage of the first terminal and the wireless charging signal may be sent out, so that power supply of the first terminal to another receiving device is implemented. In addition, according to the embodiments of the present disclosure, the power of the first terminal for power supply is increased by stepping up a voltage. Therefore, on one hand, a current in a coil of the first terminal for sending a wireless charging signal out is in a controllable range, heat of the coil can be reduced, and loss of the coil can be further reduced; and on the other hand, the charging speed of the another receiving device can be increased, and the power supply efficiency can be improved.

Moreover, in the embodiments of the present disclosure, the step-up ratio for the power supply step-up mode may further be determined based on the charging/discharging control signal to implement switching of the first terminal between different step-up ratios. Therefore, when the first terminal is configured for power supply, a proper step-up ratio can be adopted to charge another receiving device, and a charging requirement of the another receiving device can be met.

Furthermore, in the embodiments of the present disclosure, when it is determined that the charging/discharging control signal is a charging control signal, the charging step-down mode may be adopted to step down the received wireless charging signal, and power may be supplied to the first terminal based on the stepped-down voltage, thereby wirelessly charging the first terminal.

Figure 7A:
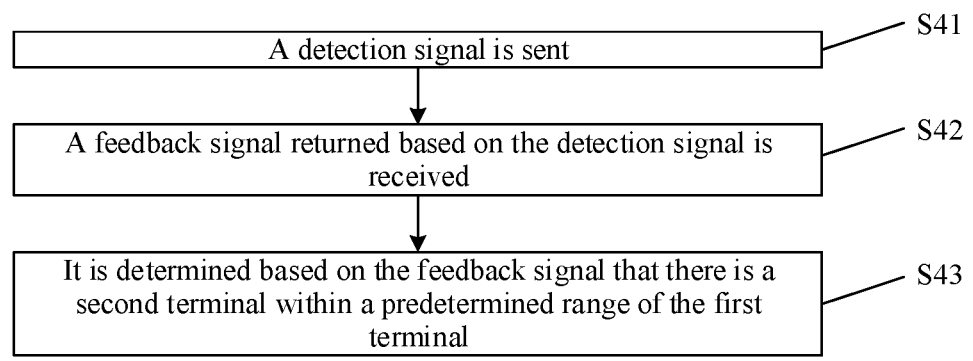
FIG. 7A is a flowchart showing a charging method according to an exemplary embodiment.

FIG. 7A is a flowchart showing a charging method according to an exemplary embodiment. As shown in FIG. 7A, the method may further include the following operations.

In S41, a detection signal is sent.

In S42, a feedback signal returned based on the detection signal is received.

In S43, it is determined based on the feedback signal that there is a second terminal within a predetermined range of the first terminal.

In an embodiment, the detection signal may be an analogue echo detection signal. For example, the detection signal may be a ping signal. The detection signal may be a signal lower than a predetermined frequency.

It can be understood that, when a frequency of the detection signal is higher, energy contained from the detection signal can be higher, so that a detection signal with an excessively high frequency may cause an overvoltage damage to a receiver chip of the second terminal. Therefore, in the embodiments of the present disclosure, the frequency of the detection signal may be limited to be lower than a predetermined frequency to reduce damage to the receiver chip of the second terminal.

In an embodiment, the feedback signal and the detection signal may be different in frequency.

In an embodiment, the predetermined range may be a range of values less than 5 millimeters.

The second terminal can be any electronic device capable of receiving a radio frequency signal. For example, the second terminal may be a mobile communication device such as a mobile phone or a notebook computer, etc.

In the embodiments of the present disclosure, the first terminal may send a detection signal with a certain frequency. In a case that a feedback signal returned based on the detection signal is received, for example, a feedback signal with frequency changes is received, it may be further determined that there is the second terminal in the predetermined range of the first terminal. In such case, the second terminal may be wirelessly charged by the first terminal in the embodiments of the present disclosure.

In an embodiment, shown in FIG. 2, when the first terminal turns on a switch of wireless power supply software and the controller 14 controls the first switching component 151 to be turned on and controls the second switching component 152 to be turned off, the first terminal may send a detection signal.

In some embodiments, the method may further include that: a target frequency for sending the detection signal is determined based on the voltage stepped up during power supply of the first terminal, and the detection signal is sent based on the target frequency.

As shown in FIG. 2, the target frequency for sending the detection signal may be determined based on a voltage at Vout, the voltage at Vout being the voltage stepped up during power supply of the first terminal.

For example, a list of corresponding relationships between a voltage stepped up during power supply of the first terminal (a voltage at Vout) and a frequency may be created. The list of corresponding relationships may be stored in the first terminal. A present voltage at Vout may be detected, and a frequency corresponding to the present voltage at Vout may be selected as the target frequency based on the list of corresponding relationships.

The voltage stepped up during power supply of the terminal in the above embodiments may be considered as a power supply voltage. In an embodiment, when the power supply voltage is greater than a first voltage threshold, the target frequency may be greater than a first frequency threshold. When the power supply voltage is lower than a second voltage threshold, the target frequency may be less than the first frequency threshold. The first voltage threshold may be greater than the second voltage threshold and the first frequency threshold may be lower than a second frequency threshold.

In the embodiments of the present disclosure, the target frequency for the detection signal may be selected based on different voltages stepped up during power supply of the first terminal, and the detection signal may be sent based on the target frequency. Therefore, in the embodiments of the present disclosure, a magnitude of a power supply voltage output by the first terminal may be notified to the second terminal through a detection signal, which is favorable for the second terminal to determine whether to select the first terminal for charging or not.

In some embodiments, the method may further include that: authentication information of the second terminal is acquired; and based on the authentication information, the step-up ratio is controlled to be a first step-up ratio for work when the second terminal succeeds in authentication, or the step-up ratio is controlled to be a second step-up ratio when the second terminal fails in authentication, the first step-up ratio being higher than the second step-up ratio.

The operation that the authentication information of the second terminal is acquired may include that: the authentication information provided by the second terminal is received; or, the authentication information is obtained based on demodulation of the received wireless charging signal.

In an embodiment, the operation that the authentication information of the second terminal is acquired may be implemented by out-of-band communication or in-band communication. The out-of-band communication may be receiving the authentication information provided by the second terminal. For example, the authentication information sent by the second terminal may be received by near field communication (NFC), Zigbee, Bluetooth (BT) or the like. The in-band communication may be acquiring the authentication information based on demodulation of the received wireless charging signal. For example, the second terminal may include the authentication information into the wireless charging signal and send the authentication information together with the wireless charging signal, so that the first terminal can obtain the authentication information based on demodulation of the received wireless charging signal.

Accordingly, when the authentication information is sent by the in-band communication, the authentication information may be directly acquired from the wireless charging signal, and the authentication information is not required to be independently sent, so that communication resources can be saved.

When the authentication information is sent by the out-of-band communication, the impact of load fluctuations, coil coupling and the like on the authentication information can be reduced, and the failure probability of demodulation of the authentication information can be reduced, so that the probability of charging interruption is reduced, and the communication quality is further greatly improved.

In the embodiments of the present disclosure, the authentication information is configured to indicate whether the second terminal is a legal authentication device or not. If the second terminal is a legal authentication device, it may be determined that the second terminal succeeds in authentication, otherwise, it may be determined that the second terminal fails in authentication.

In an embodiment, in case of successful authentication, the first terminal and the second terminal may adopt a private protocol for wireless charging; and in case of failed authentication, the first terminal and the second terminal may adopt a baseline power profile (BPP) protocol or extended power profile (EPP) protocol of a standard QI specification for charging.

In the embodiment, the BPP protocol is a wireless charging protocol supporting 5 W, and the EPP protocol is a wireless charging protocol supporting 10 W.

In an embodiment, the first step-up ratio may be a step-up ratio determined when the private protocol is adopted for wireless charging in the abovementioned embodiments. For example, the first step-up ratio may be 1:2 or 1:4. The second step-up ratio may be a step-up ratio determined when the BPP protocol or EPP protocol of the QI specification is adopted in the abovementioned embodiments. For example, the second step-up ratio may be 1:1.

In the embodiments of the present disclosure, whether the second terminal passes authentication or not may be determined through the authentication information. When the second terminal passes authentication, a higher step-up ratio may be adopted to wirelessly charge the second terminal. When the second terminal fails in authentication, a lower step-up ratio may be adopted to wirelessly charge the second terminal. Therefore, a proper step-up ratio may be determined to charge the second terminal according to the type of the second terminal.

In some embodiments, before the operation that the authentication information provided by the second terminal is received, the method may further include that: an authentication request is sent to the second terminal, the authentication information being returned based on the authentication request, or, the authentication information being pushed by the second terminal.

In the embodiments of the present disclosure, the first terminal may actively send the authentication request to the second terminal, which is favorable for the second terminal to send the authentication information based on the authentication request, thereby determining whether the second terminal passes authentication or not based on the authentication information. In the embodiments, the authentication request may also be sent to the second terminal based on in-band communication or out-of-band communication.

In some embodiments, the method may further include that: charging capability information of the second terminal is acquired; and the charging/discharging control signal for controlling the step-up ratio is determined based on the authentication information and the charging capability information. The charging capability information may include at least one of: a received charging power, a received charging voltage, and a received charging current.

In the embodiments of the present disclosure, a proper step-up ratio for charging of the second terminal may be determined according to the authentication information and charging capability information of the second terminal, so that a charging requirement of the second terminal can be met. For example, when the second terminal is a receiving device that passes authentication but a charging power that can be received by the second terminal is lower than a predetermined power, the first terminal may determine a voltage ratio corresponding to the predetermined power. Therefore, the damage caused by an excessively high charging power to the second terminal can be reduced while the charging requirement of the second terminal is met.

In another embodiment, the method may include that: the charging/discharging control signal for controlling the step-up ratio is determined based on the authentication information only.

In some embodiments, the method may further include that: in response to determining to charge the first terminal, a battery module is charged through a wired charging signal received by a USB interface of the first terminal.

In the embodiments of the present disclosure, the wired charging signal may also be received through the USB interface of the first terminal, thereby implementing wired charging of the first terminal.

Figure 7B:
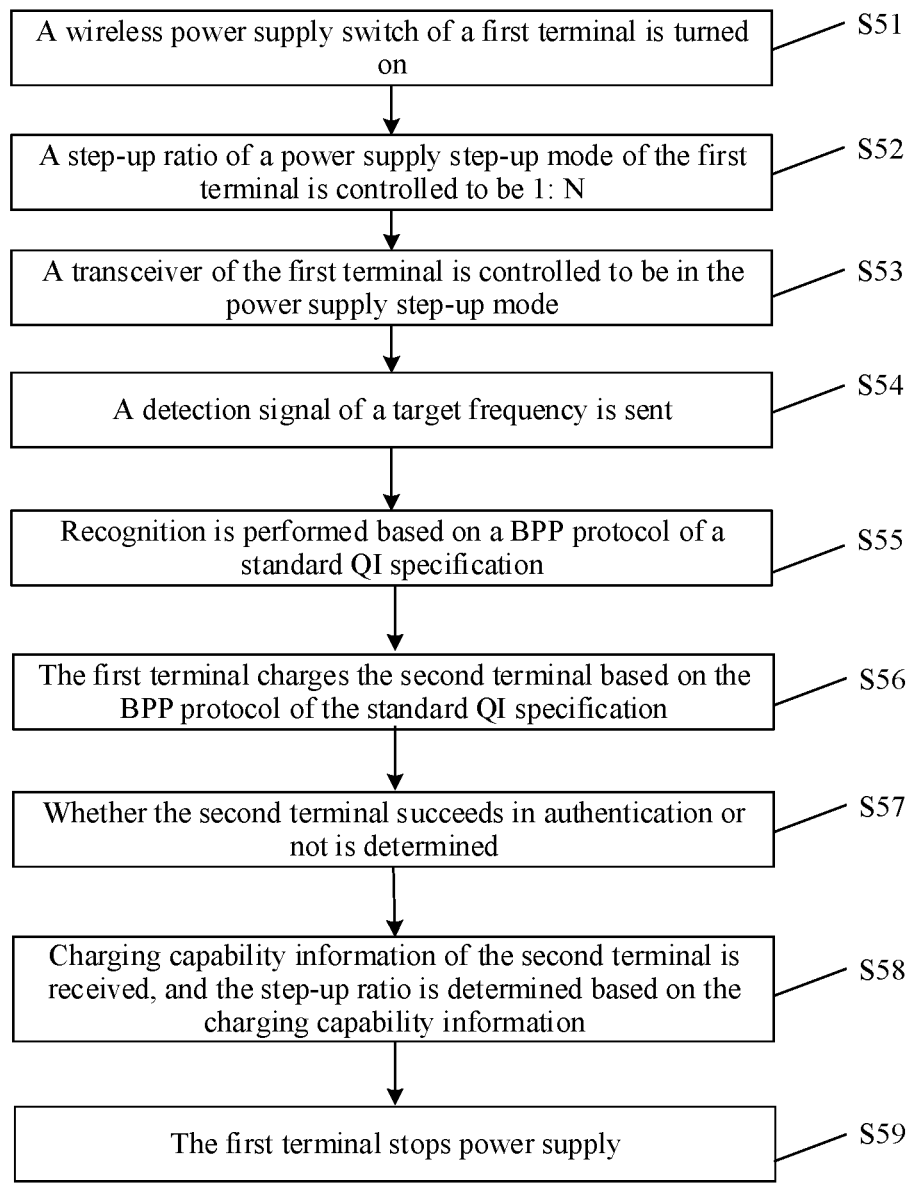
FIG. 7B is a flowchart showing a charging method according to an exemplary embodiment.

FIG. 7B is a flowchart showing a charging method according to an exemplary embodiment. The charging method includes the following operations.

In S51, a wireless power supply switch of a first terminal is turned on.

In an embodiment, responsive to turning on the power supply switch of a display interface of the first terminal, a wireless power supply step-up mode of the first terminal may be turned on.

The first terminal may be a wireless reverse charging device. For example, the first terminal may be a mobile phone.

A processor of a charging device of the first terminal may control a first switching component to be turned on and control a second switching component to be turned off according to a charging/discharging control signal. The charging/discharging control signal may be generated based on the power supply switch acting on the display interface of the first terminal. The processor may be the controller described above.

In S52, a step-up ratio of a power supply step-up mode of the first terminal is controlled to be 1:N.

In an embodiment, the processor may control the step-up ratio of the power supply step-up mode to be 1:N, N being a positive integer greater than 1, such that a power supply voltage of a transceiver of the first terminal is increased to be N times a voltage input to the transceiver.

For example, when 1:N is 1:2, the power supply voltage sent by the first terminal may be 2×VBAT. The VBAT may represent a battery voltage. For example, if VBTA is about (3.9, 4.4)V, the power supply voltage may be about (7.8, 8.8)V.

In an embodiment, when a battery is a double-battery system, the step-up ratio of the power supply step-up mode of the first terminal may be controlled to be 1:1. In such case, the power supply voltage sent by the first terminal may also be 2×VBAT.

In S53, a transceiver of the first terminal is controlled to be in the power supply step-up mode.

In response to that the processor detects there is a power supply voltage at an output end of the transceiver, the transceiver may be initialized through an inter-integrated circuit (I2C) interface, and the transceiver may be controlled to work in a sending mode such that the transceiver can send a wireless signal out.

In S54, a detection signal of a target frequency is sent.

In an embodiment, the transceiver may automatically detect the power supply voltage, determine the target frequency of the detection signal according to the power supply voltage and send the detection signal based on the target frequency. The detection signal may be a ping signal.

In S55, recognition is performed based on a BPP protocol of a standard QI specification.

In an embodiment, the first terminal may recognize a second terminal within a predetermined range based on the BPP protocol of the standard QI specification.

For example, the second terminal may be arranged on the first terminal. In such case, a coil of a receiving device and a coil of the first terminal can be in a predetermined distance range. When the first terminal detects that the frequency of the sent detection signal changes, it may be determined that there is the second terminal in the predetermined range.

The second terminal may be the receiving device, and the receiving device may be any device capable of receiving the wireless signal. For example, the receiving device may be a mobile phone.

In S56, the first terminal charges the second terminal based on the BPP protocol of the standard QI specification.

In S57, whether the second terminal succeeds in authentication or not is determined.

In an embodiment, the first terminal may send an authentication request to the second terminal and receive authentication information returned by the second terminal based on the authentication request. When it is determined based on the authentication information that the second terminal is a legal device, it may be determined that the second terminal passes authentication. When it is determined based on the authentication information that the second terminal is not a legal device, it may be determined that the second terminal fails in authentication.

In an embodiment, when authentication succeeds, it may be determined that a step-up ratio of the second terminal is 1:N. When authentication fails, it may be determined that the step-up ratio of the second terminal is 1:1.

In an embodiment, when authentication succeeds, it may be determined that the second terminal adopts 1:N determined in S52 for power supply. When authentication fails, it may be determined that the second terminal keeps adopting the BPP protocol of the standard QI specification in S55 for power supply.

In another embodiment, after it is determined that the second terminal passes authentication, the following operation may further be included.

In S58, charging capability information of the second terminal is received, and the step-up ratio is determined based on the charging capability information.

In an embodiment, the first terminal may receive the charging capability information from the second terminal and determine the step-up ratio of the first terminal for power supply based on the charging capability information.

For example, the terminal capability information of the second terminal may be 20 W power information, and the processor of the first terminal may control the step-up ratio to be 1:4. In such case, the power supply voltage of the first terminal may be 4×VBAT. When a VBAT is (3.9, 4.4)V, the power supply voltage of the first terminal may (3.9, 4.4)V, and it can be substantially ensured that the coil of the transceiver of the first terminal is within 1.25 A. Therefore, heat of the coil may be greatly reduced.

In S59, the first terminal stops power supply.

In an embodiment, when it is determined that the second terminal moves to a target distance, the first terminal may be determined to stop power supply, the target distance being outside the predetermined distance range. Or, responsive to turning off the power supply switch of the display interface of the first terminal, the first terminal may be controlled to stop power supply.

In an embodiment, the processor of the first terminal may turn off the first switching component to stop power supply of the first terminal.

In an embodiment, the transceiver of the first terminal may also include a module realizing at least one of functions of overvoltage protection, overcurrent protection, over-temperature protection and foreign object detection, to improve the working security of the first terminal.

In the embodiments of the present disclosure, when the first terminal is configured for power supply and when the step-up ratio 1:4 or a higher step-up ratio is adopted, the power supply voltage that is provided may reach 20 W or more, so that the wireless charging power is greatly increased. In addition, the power supply voltage may also be increased to improve the wireless charging efficiency while the wireless charging power being increased. Moreover, the power supply voltage may be increased to increase the power, so that a current in a coil may be relatively limited to a controllable range, heat of the coil may further be reduced, and loss of the coil is reduced.

In the embodiments of the present disclosure, authentication may also be performed to determine that a receiving device succeeding in authentication adopts a step-up ratio 1:N. Or, a step-up ratio 1:N may be determined for charging based on the charging capability information of the receiving device, N being a positive integer greater than 1. Or, ordinary BPP charging may be adopted for a receiving device failing in authentication. Therefore, a proper charging mode may be selected for charging according to a charging capability, power requirement and the like of the receiving device. In such a manner, the standard management and security in the field of wireless charging may also be improved, and relatively high power is adopted for charging of the receiving device succeeding in authentication only.

Embodiments of the present disclosure also provide a terminal, which includes: a processor and a memory configured to store instructions executable by the processor. The processor is configured to execute the instructions to perform the charging methods described above.

The memory may include any type of storage medium. The storage medium may be a non-transitory computer storage medium and may store information in a communication device after a power failure of the communication device.

The processor may be connected with the memory through a bus and the like, and is configured to execute a program stored in the memory to perform the charging methods described above.

Figure 8:
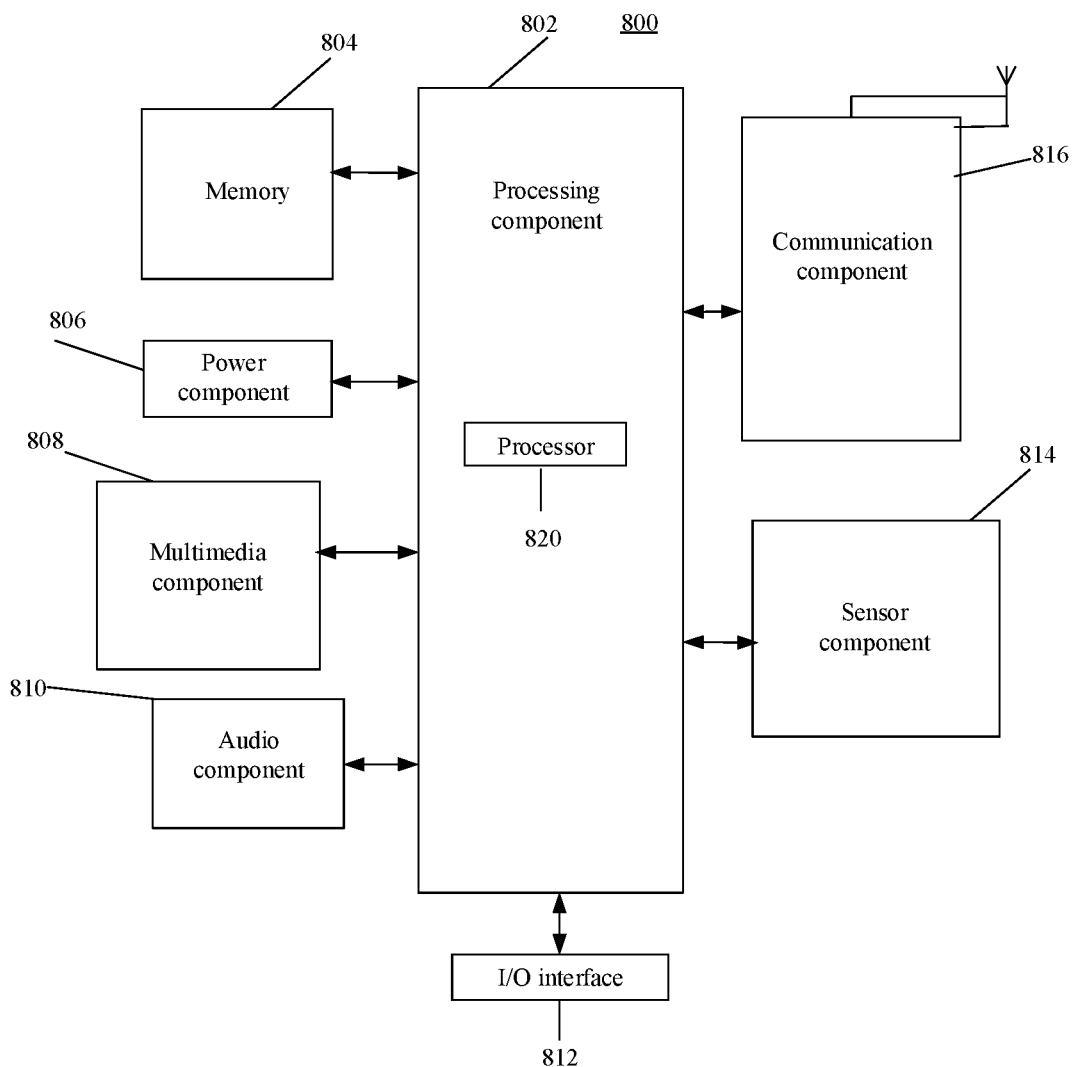
FIG. 8 is a block diagram of a charging device according to an exemplary embodiment.

FIG. 8 is a block diagram of a charging device 800 according to an exemplary embodiment. For example, the device 800 may be a mobile phone, a computer, a digital broadcast terminal, a messaging device, a gaming console, a tablet, a medical device, exercise equipment, a personal digital assistant and the like.

Referring to FIG. 8, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the operations in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 may provide power for various components of the device 800. The power component 806 may include a power management system, one or more power supplies, and other components associated with generation, management and distribution of power for the device 800.

The multimedia component 808 may include a screen providing an output interface between the device 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode and a voice recognition mode. The received audio signal may further be stored in the memory 804 or sent through the communication component 816. In some embodiments, the audio component 810 may further include a speaker configured to output the audio signal.

The I/O interface 812 may provide an interface between the processing component 802 and a peripheral interface module, and the peripheral interface module may be a keyboard, a click wheel, a button and the like. The button may include, but not limited to: a home button, a volume button, a starting button and a locking button.

The sensor component 814 may include one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and another device. The device 800 may access a communication-standard-based wireless network, such as a Wireless Fidelity (WiFi) network, a 4th-Generation (4G) or 5th-Generation (5G) network or a combination thereof. In an exemplary embodiment, the communication component 816 receives a broadcast signal or broadcast associated information from an external broadcast management system through a broadcast channel In an exemplary embodiment, the communication component 816 may further include an NFC module to facilitate short-range communication. In an exemplary embodiment, the communication component 816 may be implemented based on a Radio Frequency Identification (RFID) technology, an Infrared Data Association (IrDA) technology, an Ultra-Wide Band (UWB) technology, a BT technology and another technology.

In an exemplary embodiment, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components.

In an exemplary embodiment, there is also provided a non-transitory computer-readable storage medium including instructions, such as the memory 804 including instructions. The instructions may be executed by the processor 820 of the device 800 to perform the charging methods described above. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Other implementations of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A bidirectional charging device, implemented by a first terminal, the bidirectional charging device comprising a transceiver, a voltage converter, and a power supply, wherein:

the voltage converter comprises at least two step-up ratios;

the voltage converter is connected with the transceiver and the power supply, and is configured to step up a voltage output by the power supply and provide the stepped up voltage for the transceiver when the first terminal supplies power, and to step down a voltage input by the transceiver and supply the stepped down voltage to the power supply when the first terminal is charged; and the transceiver is configured to send a wireless charging signal out based on the voltage stepped up by the voltage converter when the first terminal supplies power, and to receive a wireless charging signal and convert the received wireless charging signal into an input voltage to transmit the input voltage to the voltage converter when the first terminal is charged, wherein the bidirectional charging device further comprises a switch connected with and between the voltage converter and the power supply;

the switch comprises a switching component, and the power supply comprises a battery and a charging management chip;

the switching component is connected with and between the voltage converter and the charging management chip; and the charging management chip is connected with the battery, and when the first terminal is charged, the charging management chip is configured to adjust the voltage stepped up by the voltage converter to a preset threshold range.

2. The bidirectional charging device of claim 1, further comprising a controller connected with the voltage converter, wherein the controller is configured to control the step-up ratios of the voltage converter for stepping up.

3. The bidirectional charging device of claim 1, wherein:

the switching component is a second switching component, and the switch further comprises a first switching component; and the switch is further connected with the controller, and is configured to switch an on/off state based on a control signal received from the controller to isolate a power supply loop of the charging device from a charging loop of the charging device, wherein the power supply loop is a loop formed by the power supply, the first switching component, the voltage converter, and the transceiver, and the charging loop is a loop formed by the transceiver, the voltage converter, the second switching component, and the power supply.

4. The bidirectional charging device of claim 3, wherein:

the first switching component is connected with the voltage converter and the battery.

5. The bidirectional charging device of claim 4, wherein the charging management chip is a first charging management chip, and the bidirectional charging device further comprises a third switching component, wherein:

the power supply further comprises a second charging management chip;

the third switching component is connected with a universal serial bus (USB) interface of the first terminal; and the second charging management chip is connected with the third switching component and the battery, and is configured to send, to the third switching component, a control signal of controlling whether to turn on the third switching component based on a wired charging signal received by the USB interface, wherein the wired charging signal received by the USB interface is transmitted to the power supply when the third switching component is turned on.

6. A bidirectional charging method, implemented by a first terminal, the method comprising:

acquiring a control signal;

determining whether the control signal is a power supply control signal or not;

when the control signal is the power supply control signal, selecting a target power supply step-up mode from at least two step-up modes to step up a battery voltage of the first terminal; and sending a wireless charging signal out based on a stepped-up power supply signal, wherein the first terminal comprises a voltage converter, a power supply, and a switch connected with and between the voltage converter and the power supply;

the switch comprises a switching component, and the power supply comprises a battery and a charging management chip;

the switching component is connected with and between the voltage converter and the charging management chip; and the charging management chip is connected with the battery, and when the first terminal is charged, the charging management chip is configured to adjust the battery voltage stepped up by the voltage converter to a preset threshold range.

7. The method of claim 6, further comprising:

determining a step-up ratio for the target power supply step-up mode based on the control signal, the step-up ratio comprising at least two step-up ratios.

8. The method of claim 6, further comprising:

when the control signal is a charging control signal, adopting a charging step-down mode to step down a received wireless charging signal, and charging the first terminal based on a stepped-down voltage.

9. The method of claim 6, further comprising:

sending a detection signal;

receiving a feedback signal, the feedback signal being returned based on the detection signal; and determining based on the feedback signal that there is a second terminal within a predetermined range of the first terminal.

10. The method of claim 9, further comprising:

determining a target frequency for sending the detection signal, based on the voltage stepped up during power supply of the first terminal, wherein sending the detection signal comprises sending the detection signal based on the target frequency.

11. The method of claim 9, further comprising:

acquiring authentication information of the second terminal; and based on the authentication information, controlling a step-up ratio to be a first step-up ratio for work when the second terminal succeeds in authentication, or controlling the step-up ratio to be a second step-up ratio when the second terminal fails in authentication, the first step-up ratio being higher than the second step-up ratio.

12. The method of claim 11, wherein acquiring the authentication information of the second terminal comprises one of:

receiving the authentication information provided by the second terminal; or obtaining the authentication information based on demodulation of a received wireless charging signal.

13. The method of claim 12, before receiving the authentication information provided by the second terminal, further comprising one of:

sending an authentication request to the second terminal, wherein the authentication information is returned based on the authentication request; or the authentication information is pushed by the second terminal.

14. The method of claim 12, further comprising:

acquiring charging capability information of the second terminal; and determining the control signal for controlling the step-up ratio based on the authentication information and the charging capability information.

15. The method of claim 6, further comprising:
in response to determining to charge the first terminal, charging a battery module through a wired charging signal received by a universal serial bus (USB) interface of the first terminal.

16. A non-transitory computer-readable storage medium having stored therein instructions that, when executed by a processor of a first terminal, cause the first terminal to perform the bidirectional charging method of claim 6.

17. A terminal, comprising:
a processor; and
a memory configured to store instructions executable by the processor,
wherein the processor is configured to perform:
acquiring a control signal;
determining whether the control signal is a power supply control signal or not;
when the control signal is the power supply control signal, selecting a target power supply step-up mode from at least two step-up modes to step up a battery voltage of the terminal; and
sending a wireless charging signal out based on a stepped-up power supply signal,
wherein the terminal further comprises a voltage converter, a power supply, and a switch connected with and between the voltage converter and the power supply;
the switch comprises a switching component, and the power supply comprises a battery and a charging management chip;
the switching component is connected with and between the voltage converter and the charging management chip; and
the charging management chip is connected with the battery, and when the terminal is charged, the charging management chip is configured to adjust the battery voltage stepped up by the voltage converter to a preset threshold range.

18. The terminal of claim 17, wherein the processor is further configured to:
determine a step-up ratio for the target power supply step-up mode based on the control signal, the step-up ratio comprising at least two step-up ratios.

19. The terminal of claim 17, wherein the processor is further configured to:
when the control signal is a charging control signal, adopt a charging step-down mode to step down a received wireless charging signal, and charge the terminal based on a stepped-down voltage.

20. The terminal of claim 17, wherein the processor is further configured to:
send a detection signal;
receive a feedback signal, the feedback signal being returned based on the detection signal; and
determine based on the feedback signal that there is a second terminal within a predetermined range.

* * * * *